United States Patent [19]

Ablabutyan

[11] Patent Number: 5,277,275

[45] Date of Patent: Jan. 11, 1994

[54] MECHANICAL PLATFORM CLOSER FOR CANTILEVER STYLE LIFTGATE

[75] Inventor: Karapet Ablabutyan, Los Angeles, Calif.

[73] Assignee: Maxon Industries, Inc., Los Angeles, Calif.

[21] Appl. No.: 26,444

[22] Filed: Mar. 4, 1993

[51] Int. Cl.$^5$ .............................................. B60S 11/00
[52] U.S. Cl. ................................. 187/8.71; 187/8.41; 187/9 R; 296/57.1
[58] Field of Search ................... 187/8.41, 8.56, 8.71, 187/9 R, 10; 296/57.1; 414/545, 556, 557

[56] References Cited

U.S. PATENT DOCUMENTS

| | | | |
|---|---|---|---|
| 2,348,993 | 5/1944 | Novotney | 414/557 |
| 2,456,805 | 12/1948 | Wohlforth | 414/556 |
| 2,792,135 | 5/1957 | Wood | 414/557 |
| 3,771,672 | 11/1973 | Randall | 414/557 |
| 3,799,373 | 3/1974 | Randall | 414/557 |
| 3,883,014 | 5/1975 | Glomski et al. | 414/557 |
| 4,079,988 | 3/1978 | Randall | 296/57.1 X |
| 4,273,217 | 6/1981 | Kajita | 187/9 R |
| 4,729,712 | 3/1988 | Corley, Jr. | 414/557 |
| 4,836,736 | 6/1989 | Neagu | 187/9 R X |

FOREIGN PATENT DOCUMENTS

| | | | |
|---|---|---|---|
| 57-30630 | 2/1982 | Japan | 187/9 R X |
| 58-122234 | 7/1983 | Japan | 414/545 X |

Primary Examiner—D. Glenn Dayoan
Assistant Examiner—Dean A. Reichard
Attorney, Agent, or Firm—Frederick E. Mueller

[57] ABSTRACT

In a parallelogram linkage system whose swingable outer end supports a platform turnable between horizontal and vertical positions, the parallel arm has a hub to rotatably support a crank member. The companion lift arm of the linkage carries an actuator pin engaged with a cam surface of the crank member. The cam surface is disposed generally radially with respect to the hub and oppositely to a pin carried at the other side of the crank member. One end of the drive link is pivotally connected to the crank member pin with the opposite end pivotally connected to a short link whose upper end is coaxially pivotally connected at the pivot axis of the load platform. The platform mounts a stop member that is movable between active and inactive positions. In the active position, the stop member abuts the outer end of the drive link whereby upon cammed rotation of the crank member the platform is turned between horizontal and vertical positions.

11 Claims, 4 Drawing Sheets

MECHANICAL PLATFORM CLOSER FOR CANTILEVER STYLE LIFTGATE

The present invention relates generally to load elevators and, more particularly, to load elevators of the liftgate type commonly seen on trucks and, sometimes, at loading docks.

BACKGROUND OF THE INVENTION

A common type of truck tailgate lift comprises a rectangular load platform pivotally connected at a forward edge to the swingable rear ends of a pair of parallelogram linkages. The forward ends of the linkages are secured to the bed, frame or chassis of the truck and a power means, typically an electrical hydraulic system, is provided for raising and lowering the load platform relative to the bed of the truck. The parallelogram linkages maintain a substantially horizontal, active attitude of the load platform during freight handling operations. When not used for loading purposes, the load platform is turned upwardly to substantially vertical attitude to a transit position in which it may also serve as the closer for the tailgate opening of the truck body.

In the past, a variety of mechanisms have been developed for turning the load platform between horizontal and vertical positions by the use of either the power cylinder or cylinders that raise and lower the liftgate or the use of a dedicated, separate power cylinder or cylinders. One commonly used approach in the former arrangement uses a spaced apart pair of cam blocks on the rearwardly facing vertical surface of the sill of the truck bed which are engagable by a spaced pair of cam followers mounted to the forward edge of the load platform. The present invention is an improvement over all of these systems.

SUMMARY OF THE INVENTION

In one of the parallelogram linkages an actuator stud or pin is affixed to one side of the lift frame arm to project laterally into a slot formed in a delta shaped link or crank that has a hub pivotally mounted onto one side of the companion parallel arm of the linkage. One lobe of the delta link projects in the direction oppositely to the actuator pin, and at its extremity, is fitted with a laterally projecting pin pivotally mounting one end of a drive link, whose opposite end is pivotally connected to a short link whose upper end is coaxially pivotally connected at the pivot axis of the load platform. The relationship of the actuator pin and delta link hub is such that an increment of vertical movement of the parallel linkage as a whole effects rotation of the delta link relative to the delta link hub. As a result, the other or lower end of the delta link is rotated in a corresponding direction to compel movement of the drive link and short link connected thereto. The forward edge of the load platform, in a position of confronting relationship to the drive link, has a manually controllable member that can move between active and inactive positions. In the active position of the member, a forward end abuts the drive link and so rotates the load platform through substantially 90 degrees between transit and active positions.

DESCRIPTION OF THE PREFERRED EMBODIMENT

Figure 1:
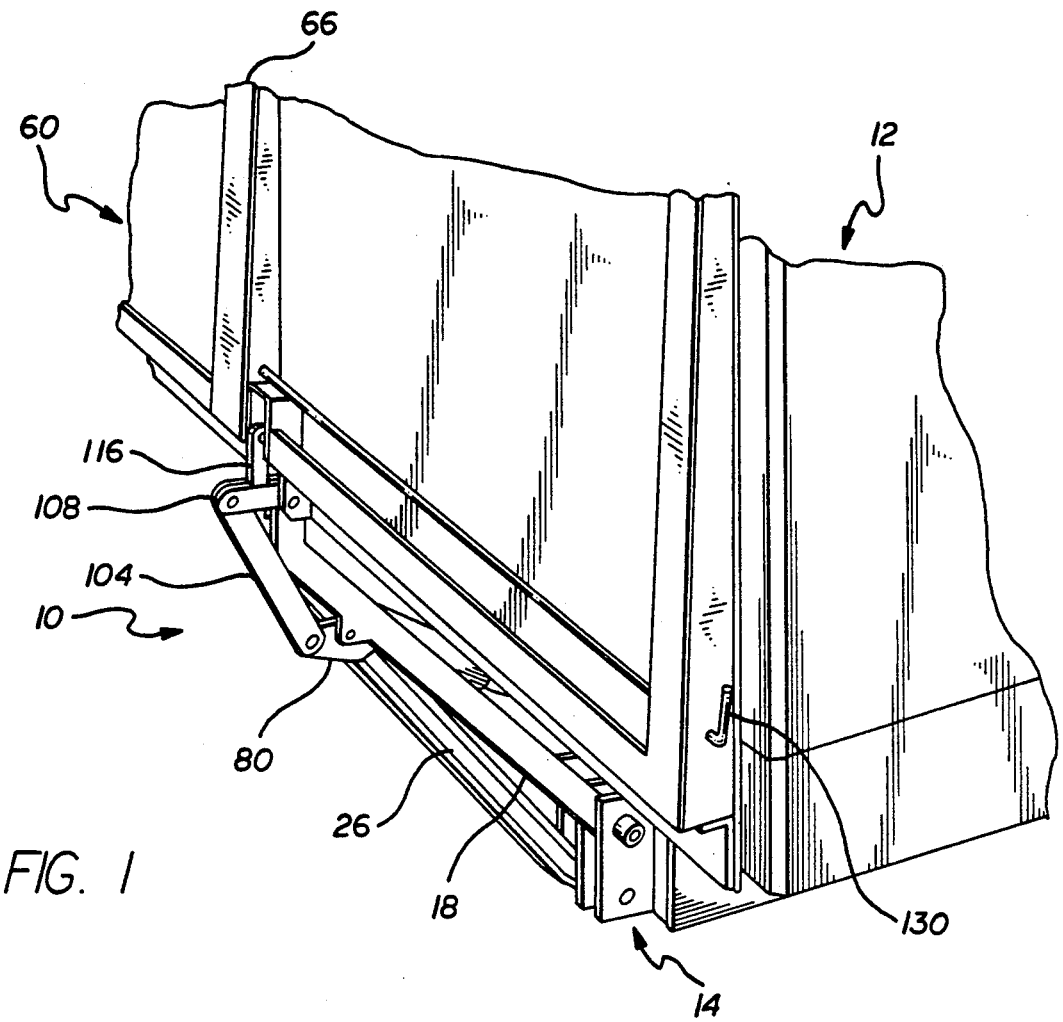
FIG. 1 is a partial perspective view of a load elevator of the invention as embodied in a liftgate mounted at the tailgate of a truck.

Before explaining the invention in detail, it is to be understood that the invention is not limited in its application to the precise details of construction and the arrangement of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Figure 2:
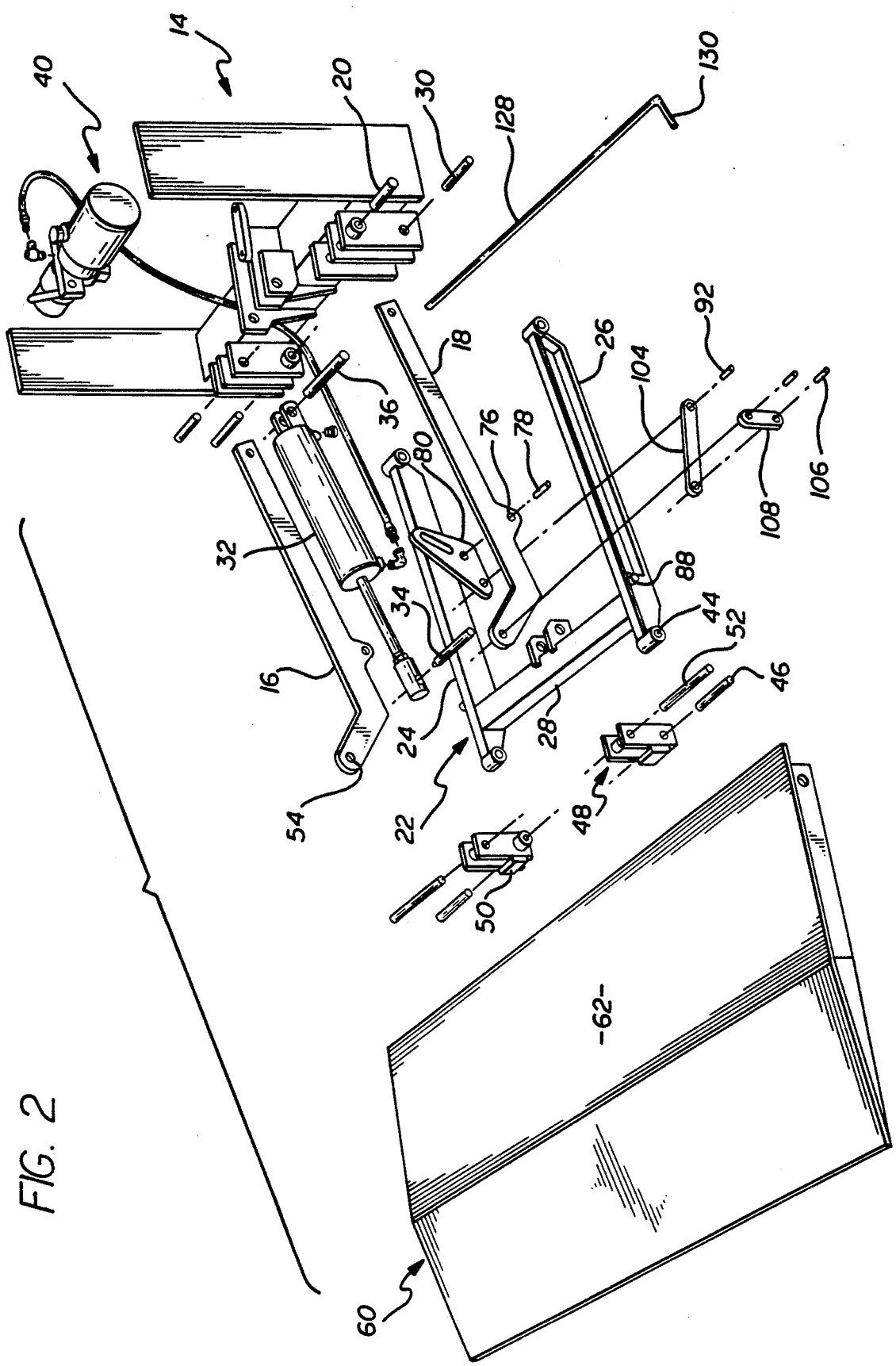
FIG. 2 is an exploded perspective view of components of the embodiment of FIG. 1.

Referring to FIG. 1, the invention is embodied in a liftgate, designated generally by the numeral 10, that is mounted at the tailgate opening of a truck 12. As shown in FIG. 2, the liftgate comprises a mainframe assembly 14 by means of which the liftgate is mounted to the chassis of the truck as a unitary assembly. The mainframe assembly has a cross-beam which mounts various brackets to which components of the liftgate are connected. Typically, the assembly comprises a laterally spaced apart pair of parallel arms 16 and 18 whose forward ends are pivotally connected to brackets of the mainframe by a coaxial pair of pins 20. Similarly, a lift frame 22, comprising a rigid assembly of a pair of lift arms 24 and 26 and a cross-beam 28, is pivotally connected at its forward end to brackets of the mainframe 14 by means of a coaxial pair of pins 30.

On or adjacent to its forward face, the cross-beam 28 of the liftframe is centrally fitted with a spaced pair of brackets between which the piston rod end of a hydraulic cylinder assembly 32 is pivotally connectable by means of a pin 34, the butt end of the cylinder assembly being connectable to appropriately located brackets of the mainframe 14 by means of a pin 36. The mainframe assembly also supports an electric hydraulic pump assembly 40 operatively associated with the hydraulic cylinder 32.

The rear ends of the liftframe arms 24 and 26 are fitted with a coaxially aligned pair of horizontally oriented sleeves 44, each of which journals a pin 46. Each of the pins 46 is pivotally connected to the lower end of a shackle assembly 48 comprising a spaced pair of plates, rigidly inter-connected at lower ends by a bridging, rearwardly facing stop plate 50. It will be understood that the pair of plates of a shackle assembly bracket the opposite ends of a sleeve 44. At their upper ends, the pair of plates of a shackle assembly are formed with coaxial holes for the reception of a long platform supporting pin 52 to extend through a hole 54 at the rear end of the corresponding one of parallel arms 16 and 18.

The load platform, designated generally by the numeral 60, comprises a top skin 62 and along its forward edge includes a transverse framing member 64 that may take the form of a angle iron beam preferably overlain by the skin 62. At spaced intervals therealong, the frame member 64 internally mounts a plurality of spaced brackets, such as bracket 66 in FIG. 3, an adjacent pair of which are formed with coaxial holes for the reception of one of the long platform supporting pins 52 of a shackle assembly 48. As is indicated in FIG. 1, the platform assembly includes fore and aft extending channel like frame members including a pair 66, forward ends of which are capped to provide a solid surface for abutment against the stop plate 50 of a shackle assembly to stop the platform in a horizontal attitude.

As is well understood in the art, as thus far described the liftgate 10 is a basic form of that class of liftgates wherein the load platform is supported on a pair of parallelogram linkage systems. That is, the vertical spacing between the pins 20 and 30 at the forward ends of the linkage systems is the same or approximately the same as the vertical spacing between the pins 52 and 46 at the rear ends of the linkage systems. Thus, as the linkage systems are raised and lowered by the electric hydraulic power means 32, the platform assembly 60 remains in a substantially horizontal attitude during raising and lowering, in both level-ride and ramping action platforms. In either case, the platform assembly 60 is turnable between horizontal active attitude and vertical transit position on the long pins 52. With the present invention, rotation of the platform between active and transit positions is accomplished automatically, powered by the same hydraulic cylinder that is used for raising and lowering freight, eliminates the use of cams separately attached to the truck bed, and operates without uneven motion of the platform during opening and closing.

Figure 5:
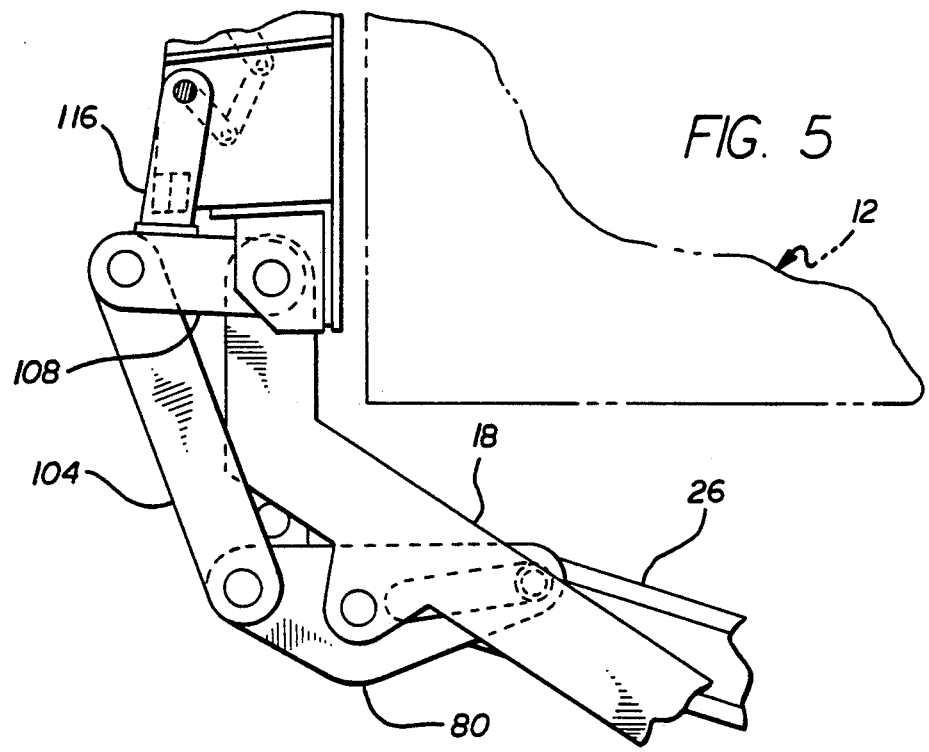
FIG. 5 is a schematic side elevational view illustrating relative positions of the components of the invention when the platform is in a closed or transit position.
Figure 3:
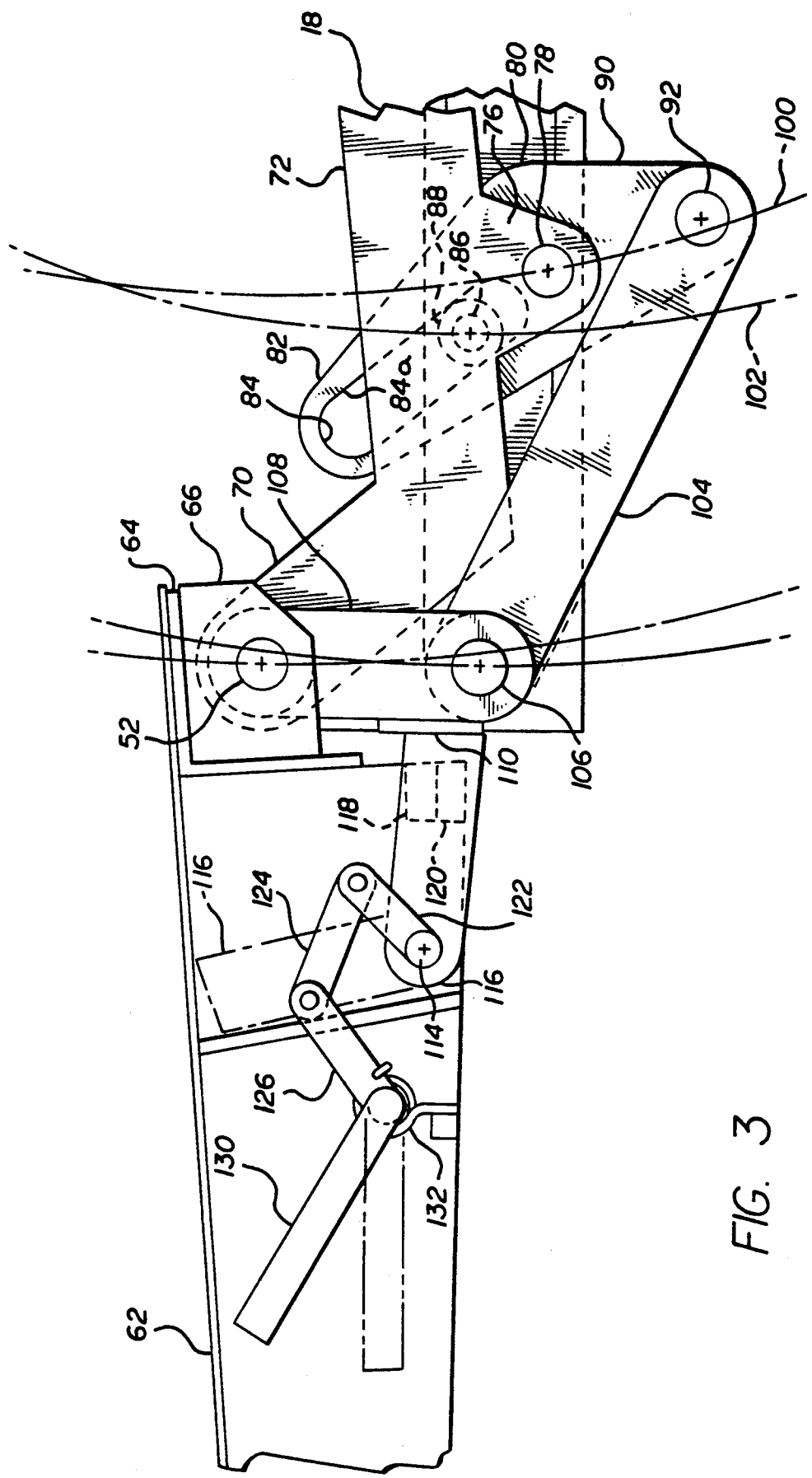
FIG. 3 is a fragmentary schematic side elevational view of components of the invention in positions assumed when the lift platform is in an active horizontally extending position, when the mechanism is in a position ready to close the platform when a short distance below the bed of the vehicle.

As will be seen from FIG. 3, the relationship of a parallel arm of a linkage system to its companion lift arm is such that the parallel arm is outwardly adjacent to the lift arm. In other words, the spacing between the lift frame arms 24 and 26 is less than that between the parallel arms 16 and 18. While the effective length of the parallel arm between pins 20 and 52 is substantially the same as that between the pins 30 and 46 for the straight lift arm, the pair of parallel arms 16 and 18 are formed with a joggle in their rear end portions, comprising a relatively short section 70 extending upwardly relative to a relatively long, straight section 72. As indicated in FIG. 5, this configuration provides clearance between the sill of the truck bed and the parallel arms of the linkage systems when the platform is in a fully elevated position, whether the platform be in the vertical transit position or in horizontal position. Although the present invention is not limited to load elevators having such bent parallel arms, advantage is preferably taken of such configuration for purposes of the invention in that, in each linkage system, rear end portions of a lift arm and parallel arm are in side-by-side, overlapping relationship.

More specifically, while the mechanical closer means of the present invention could be incorporated into both parallelogram linkages, it is presently contemplated that only one of the linkages be so adapted, at least in the case of light or medium duty liftgates. In the case of the illustrated embodiment it is assumed that only the right-hand parallel arm 72 and lift arm 26 are used.

Referring to FIG. 3, a rear end portion of the parallel arm portion 72 is formed along its lower edge with a preferably integral downwardly projecting lobe 76, having a hole to serve as a bearing for a hub pin 78 to rotatably support a delta link 80 that is keyed thereon. As indicated, the delta link, which serves as a crank means, comprises a metal plate of generally delta configuration disposed in a side-by-side, parallel relation to the vertical plane including parallel arm 18. Delta link 80 has an upwardly projecting lobe or arm portion 82 formed with a cam slot 84 that is closed at both ends and has a long axis that is preferably disposed radially with respect to the hub pin 78.

In a rear end portion of the companion lift arm 26, an actuator stud 86 is affixed thereto on the inwardly facing side thereof to rotatably support a roller 88. As indicated in FIG. 3, the stud and roller are preferably positioned adjacent the upper edge of the lift arm 26, with the roller 88 being rollingly engagable with a forward or cam side 84a of the slot 84 of the delta link. A lower end portion of the delta link 80 comprises an arm or lobe portion 90 projecting beyond the lower edge of the lift arm 26 to mount a pin 92 on a axis parallel to the axes of the hub pin 78 and roller pin 86.

Figure 4:
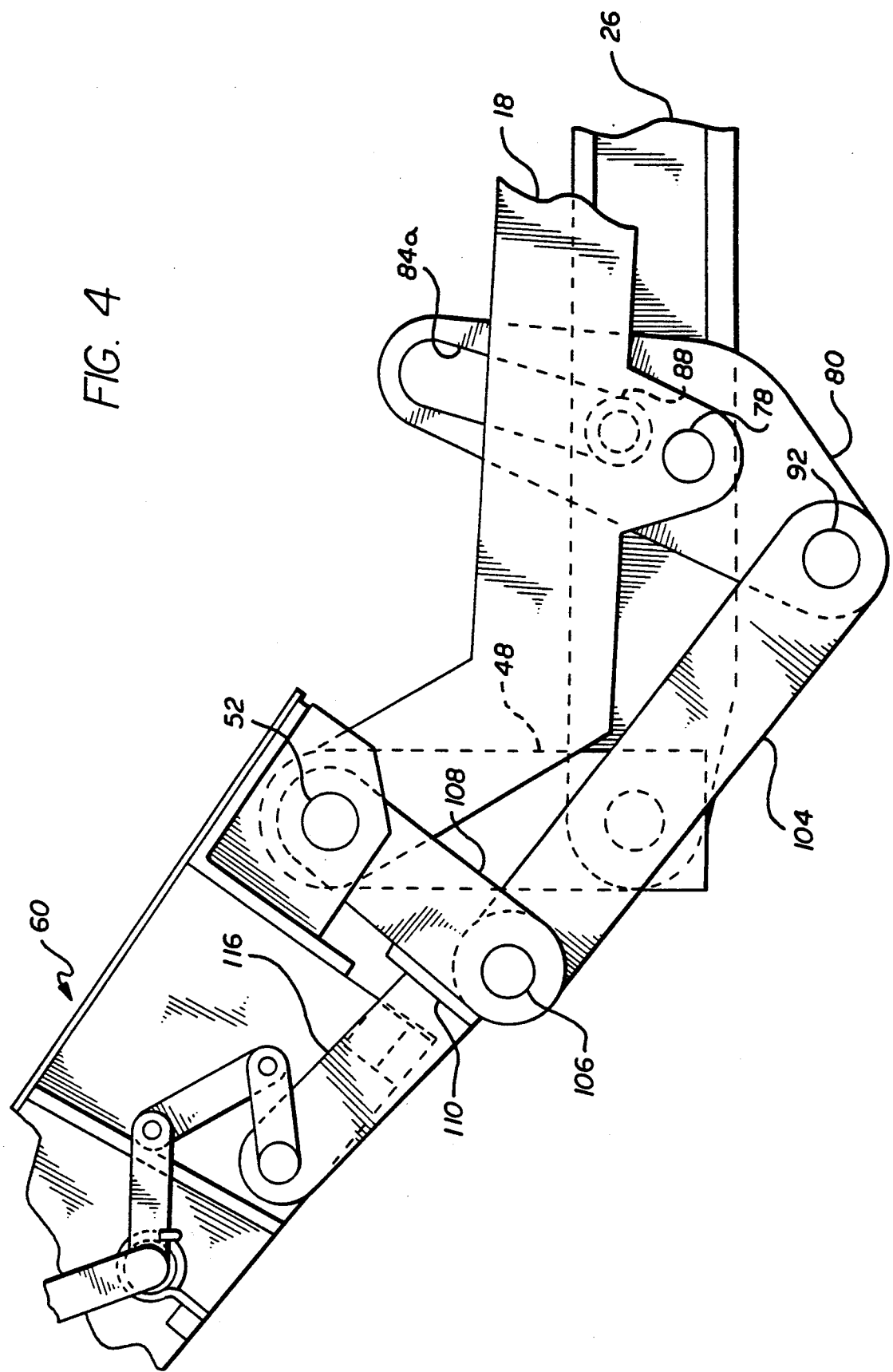
FIG. 4 is a view similar to FIG. 3 but showing components in different relative positions during an opening or closing movement of the platform.

As is shown in FIG. 3, the hub pin 78 is centered on a radius relative to the pin 20 for the parallel arm 18 that is less than the radius of the center of drive pin 86 relative to the pin 30 for the lift arm 26. Accordingly, as the linkage system is raised and lowered, the center of the hub pin 78 describes an arc 100 that intersects an arc 102 described by the center of the drive pin 86. Thus, when the mechanism is raised from the FIG. 3 position to and beyond that indicated in FIG. 4, the drive pin and roller 86, 88 effect clockwise rotation of the delta link 80 as viewed in the drawing. Thus, the torque of the lower end of the delta link arm 90 can be employed via pin 92 to effect consequent rotation of the platform assembly 60 between horizontal and vertical attitudes.

More specifically, a forward end yoke of a drive link 104 is pivotally mounted on the pin 92 and a yoke at the rear of the drive link is pivotally mounted on a pin 106 connected to the lower end of a short link 108. An upper end of the short link 108 is pivotally connected on a portion of the corresponding platform supporting long pin 52.

The rearwardly facing side of the lower end of the short link 108 is fitted with a stop plate 110 while an adjacent portion of the platform assembly 60 contains a remotely controllable part that is manually movable into contact with the stop 110. More specifically, the platform framing includes a fixed support for a pin 114 on a horizontal axis parallel to the axis of the pin 106, whereby a stop member 116, keyed to pin 114, is turnable between the active solid outline and inactive dotted outline positions thereof illustrated in FIG. 3. In order to arrest the member 116 in the solid outline position shown, a block 118 is welded to a side thereof whose bottom face is engagable with a top face of a stop block 120 affixed, as by welding, to the platform framework. The pin 114 is also keyed to a link 122 that is interconnected through a series of pivotally interconnected links 124 and 126, the latter of which has an end keyed to a shaft 128 of a control rod rotatably mounted within the platform framework. The rod has an outer handle portion 130 by means of which the stop member 116 can be rotated from the inactive phantom outline position into the active position.

A torsion spring 132 is fitted to the shaft 128 of the control rod and biased against a fixed point of the platform structure to normally retain the control handle 130 in the phantom outline position indicated in the drawings. The stop member 116 is thus automatically retracted to its inactive dotted outline position. The platform assembly 60 then remains in the horizontal position during raising and lowering of the parallelogram linkages by the electric hydraulic power means 32, 40. In this phase, the delta link 90 merely rotates idly and has no effect o the horizontal attitude of the platform.

When it is desired to close the platform, the control handle 130 is shifted to and held momentarily in the solid outline position shown in the drawing figures thereby moving stop member 116 to the solid outline position shown. This is done at a time when the horizontal platform is arrested at some point between ground level and the level of the bed of the truck, for example, 20-24 inches below truck bed level. Since the free end of the stop 116 now confronts or engages the stop plate 110 of the short link 108, when the electric hydraulic system 32, 40 is energized in a mode to accomplish raising of the platform the delta link 90 is rotated clockwise, as viewed in the drawing. The drive link then locks against and then rotates the stop member 116 and platform assembly 60 around the axis of the long pins 52 to close the platform by movement through the position in FIG. 4 to the final transit position of FIG. 5. Initially, as shown by a comparison of FIGS. 3 and 4, the actuator stud or pin 86, 88 changes in angular position relative to and approaches the hub pin 78. Thereafter, as indicated by comparison of FIGS. 4 and 5, upon a further change in angular position the actuator stud recedes from the hub pin 78 and approaches the outermost end portion of the slot 84 in the upper lobe of the delta link. The roller 88 of the actuator stud is at all times engaged with forward, cam surface side 84a of the slot 84 whereby the transition of the platform assembly 60 between horizontal and vertical attitudes is accomplished in a positive, smooth and even manner, thus enhancing the safety of operation of the mechanism. The mode of operation upon opening the platform from transit position is substantially the reverse of the closing mode, except that the stop member 116 automatically returns to its inactive position after the platform attains the horizontal position.

Several important advantages of the invention over the prior art systems will now be apparent. In the prior art system where a pair of separate cams are affixed to the sill of the truck body, great care must be taken to install them in precise registration with the cam followers mounted on the lift platform. Then, when the platform is opened it commonly moves unevenly, necessitating the use of a flow control valve in the hydraulic cylinder. Also, there can be instances in which the truck body, if not properly secured to the chassis, can be pushed forward toward the cab of the truck, causing the platform cam followers and the cams on the sill of the truck bed to not engage properly whereby the platform does not close completely. All of these disadvantages are eliminated by the present invention.

As compared to prior systems using a dedicated platform opening and closing cylinder, the present invention eliminates the need for such dedicated cylinders and the appurtenant hose, valve and brackets.

I claim:

1. A lift comprising:
a platform;
a parallelogram linkage comprising an upper arm and a lower arm, said linkage being connected at one end to a support means;
means pivotally connecting an edge of said platform to the other end of said linkage for movement of said platform between horizontal and vertical attitudes thereof;
a crank means connected between said upper and lower arms of said linkage to translate a portion of the range of vertical movement of said linkage into rotary movement of said crank means; and
a drive means for translating rotary movement of said crank means into pivotal movement of said platform.

2. A lift as in claim 1, in which:
said drive means includes a part that is displaceable between active and inactive positions thereof, whereby rotary movement of said crank means is translated into pivotal movement of said platform by said drive means only when said part is in said active position.

3. A lift as in claim 2, in which:
said crank means comprises a crank member having a hub pivotally mounted on one of said upper and lower arms of said parallelogram linkage; and
an actuator pin mounted on the other of said upper and lower arms to engage said crank member at a first location spaced to one side of said hub,
said drive means being connected to said crank member at a second location on an opposite side of said hub from said first location.

4. A lift as in claim 3, in which:
said crank member is pivotally mounted on the upper one of said upper and lower arms and said actuator pin is mounted on said lower arm of said parallelogram linkage,
said crank member being formed with a cam surface oriented in a direction extending generally radially with respect to said hub and comprising said first location and is engaged by said actuator pin.

5. A lift as in claim 4, in which:
said drive means comprises a drive link having one end pivotally connected to said crank member at said second location;
the other end of said drive link being pivotally connected to a lower end of a short link having an upper end substantially coaxially pivotally connected with a hinge means for pivotally connecting said edge of said platform to said other end of the said parallelogram linkage;
said short link having a stop plate that is engagable by said part of said drive means that is displaceable between said active and inactive positions thereof.

6. A lift as in claim 5, in which:
said displaceable part is mounted on said platform and comprises a biasing means for normally positioning said displaceable part into said inactive position;
said platform mounting a control member having an inner end operatively connected to said displaceable part and having an outer end at a side of said platform at which said displaceable part can be turned into said active position.

7. A lift comprising:
a platform;
a parallelogram linkage comprising an upper arm and a lower arm, said linkage being connectable at an inner end to a support means;
a shackle means comprising an outer end of said parallelogram linkage, said shackle means having a lower end pivotally connected to an outer end of said lower arm and having an upper end pivotally connected to an outer end of said upper arm and pivotally connecting an edge of said platform to said outer end of said linkage for movement of said platform between horizontal and vertical attitudes thereof;

a crank means connected between said upper and lower arms of said linkage to translate a portion of the vertical movement of said linkage into rotary movement of said crank means;

a drive means interconnected between said edge of said platform and said crank means for translating rotary movement of said crank means into pivotal movement of said platform; and said drive means including a part that is displaceable between active and inactive positions thereof, whereby rotary movement of said crank means is translated into pivotal movement of said platform by said drive means only when said part is in said active position.

8. A lift as in claim 7, in which:

said crank means comprises a crank member rotatably pivotally mounted on a hub carried on said upper arm of said linkage;

said crank means further comprising an actuator mounted on said lower arm of said parallelogram linkage;

said hub and said actuator being spaced differently with respect to forward pivotally mounted ends of said upper arm and said lower arm, respectively, whereby to describe intersecting arcs during said portion of vertical movement of said linkage to effect said rotary movement of said crank member.

9. A lift as in claim 8, in which:

said crank member comprises a cam surface oriented in a direction extending generally radially with respect to said hub, said cam surface being engaged by said actuator;

said drive means being connected to said crank member on an opposite side of said hub from said cam surface.

10. A lift as in claim 9, in which:

said drive means comprises a drive link having one end pivotally connected to said crank member;

the other end of said drive link being pivotally connected to a lower end of a short link having an upper end pivotally connected substantially coaxially with said upper end of said shackle means;

said short link having a stop plate that is engagable by said part of said drive means that is displaceable between said active and inactive positions thereof.

11. A lift as in claim 10, in which:

said displaceable part is mounted on said platform and comprises a biasing means for normally positioning said displaceable part into said inactive position;

said platform mounting a control member having an inner end operatively connected to said displaceable part and having a handle at its outer end at a side of said platform at which said displaceable part can be turned into said active position.

* * * * *